United States Patent [19]
Giles

[11] Patent Number: 5,850,339
[45] Date of Patent: Dec. 15, 1998

[54] ANALYSIS OF DATA IN CAUSE AND EFFECT RELATIONSHIPS

[76] Inventor: Philip M. Giles, 3654 Rutgers Dr., Bethlehem, Pa. 18017-1463

[21] Appl. No.: 741,717

[22] Filed: Oct. 31, 1996

[51] Int. Cl.$^6$ .................................................. G05B 13/02
[52] U.S. Cl. .................... 364/148; 364/148.06; 364/154; 364/148.1; 364/411
[58] Field of Search .................................... 364/191, 148, 364/151, 153, 158, 164, 194, 145, 148.06, 147, 152, 154, 411; 395/13, 11, 51, 600

[56] References Cited

U.S. PATENT DOCUMENTS

| | | | |
|---|---|---|---|
| 4,358,822 | 11/1982 | Sanchez | 364/151 |
| 5,191,521 | 3/1993 | Brosilow | 364/160 |
| 5,394,500 | 2/1995 | Winston | 395/13 |
| 5,428,712 | 6/1995 | Elad et al. | 395/51 |
| 5,442,562 | 8/1995 | Hopkins et al. | 364/468 |
| 5,521,814 | 5/1996 | Teran et al. | 364/402 |
| 5,602,752 | 2/1997 | Jankovic | 364/487 |
| 5,617,321 | 4/1997 | Frizolle et al. | 364/468.1 |
| 5,640,491 | 6/1997 | Bhat et al. | 395/22 |
| 5,640,493 | 6/1997 | Skeirik | 395/23 |

OTHER PUBLICATIONS

Statistical Ecology:a Primer on Methods and Computing—John A. Ludwig James F. Reynolds—Chapter 23—pp. 281–295.

Applied Logistic Regression—D.W. Hosmer, Jr. and S. Lemeshow Chapter 1—pp. 1–7.

Finding Groups in Data—An Introduction to Cluster Analysis L. Kaufman and P. J. Rosseeuw—pp. 37–51.

Nonmetric Clustering and Association Analysis: Implications for the Evaluation of Multispecies Toxicity Tests and Field Monitoring.

G. B. Matthews, R. A. Matthews and W. G. Landis—pp. 79–93.

*Primary Examiner*—Reba I. Elmore
*Assistant Examiner*—Ramesh Patel
*Attorney, Agent, or Firm*—David L. Davis

[57] ABSTRACT

A method for analyzing a data set and determining the independent input variables and the values of those variables which are most associated with a specific outcome. Independent and dependent variables may be either numeric (continuous) or categoric (discrete); numeric variables need not be of a specific distribution type. First, each individual independent variable is ranked based on a score. Scoring is done by first determining the number of records in the data set having each of four possible conditions—independent variable in or out of range in combination with dependent variable in or out of range. These values are put into an equation. Iterative processes are used until a high score is found. Subsequently, combinations of variables and values of independent variables are evaluated using the score to determine the combinations most likely to be associated with a specific outcome or range of values of the dependent variable. A use for this method is the determination of manufacturing variables and their values which tend to result in unacceptable product.

18 Claims, 10 Drawing Sheets

10

ANALYSIS OF DATA IN CAUSE AND EFFECT RELATIONSHIPS

MICROFICHE APPENDIX

This application contains a microfiche appendix consisting of 3 microfiche and 127 frames.

BACKGROUND OF THE INVENTION

This invention relates to a method for the analysis of data and, more particularly, to a method for determining the combination of variables and values of those variables which are most likely to result in specific outcomes. In an illustrative environment, the invention relates to a method which may be utilized for the analysis of manufacturing data encountered in computer controlled manufacturing so as to detect and avoid processing combinations which lead to defective product or to enhance the likelihood of producing superior product.

There is a class of data analysis problem, frequently encountered in manufacturing, which occurs when a specific sequence of events causes an undesirable outcome, usually unsatisfactory product. In these situations, it is desirable to find those variables and their ranges of values which, in combination, are associated with the undesirable outcome. Traditional statistical methods are limited in their ability to provide the required information. It would therefore be desirable to have a method which solves these types of data analysis problems and to have software implementing the method in a computer which can be utilized as a stand-alone device or as part of a manufacturing process control system.

In a typical scenario, a thousand pieces of product are all intended to be manufactured in exactly the same manner. Of these thousand, fifty could be determined, during final inspection, to be unacceptable. Upon examination of the, for example, twenty parameters for which data was collected about the production of the thousand products, no single parameter appeared to be related to the fifty unsatisfactory pieces. In fact, all twenty parameters for all thousand pieces could be within expected normal limits. However, the cause of the problem lies in several of the parameters having a specific combination of value ranges unique to the fifty unacceptable pieces of product. It would therefore be further desirable to have a method which permits the identification of those several parameters and their specific value ranges. This identification process often is referred to as "root cause" analysis.

U.S. Pat. No. 5,442,562 to Hopkins et al discloses a method of controlling a manufacturing process using multivariate analysis in which a surrogate variable, representing the overall state of the process, is evaluated. The surrogate variable is a function of a plurality of intermediate variables, which in turn are functions of the process and/or product variables. The surrogate variable is then used in a manner similar to that of any Statistical Process Control variable. When the value of the surrogate variable is outside a predetermined limit, the values of the intermediate and process variables are compared with an initial set of reference data which was used in the initial process of building the functions. Based on the results of this comparison, the process variables requiring adjustment are determined. Because this method relies on the availability of an historical baseline data set from which acceptable combinations of values for all variables can be determined, it is not suitable to situations, often encountered in manufacturing, where no such reference historical data exists.

U.S. Pat. No. 4,358,822 to Sanchez discloses an adaptive-predictive control system for controlling single-input, single-output or multivariable time-variant processes. The system of Sanchez uses an adaptive-predictive model to determine what control vector should be applied to the process being controlled to cause the process output to be at some desired value at a future time instant. Because the model relies on a knowledge of the cause and effect relationship between the independent and dependent variables, this method is not applicable to situations where these relationships are unknown, as is the case in "root cause" analysis.

This same type of knowledge of cause and effect relationships among variables is also described in U.S. Pat. No. 5,191,521 to Brosilow and U.S. Pat. No. 5,428,712 to Elad et al.

In addition, there is knowledge within the discipline of statistics relating to the analysis of data sets including multiple regression, logistic regression, discriminant analysis, analysis of variance, principal components analysis, cluster analysis, and classification trees. With the exception of cluster analysis and classification trees, no known method provides a direct output of the most important variables and the data ranges associated with a specific type of outcome. For numeric or continuous data, most techniques, including discriminant analysis and analysis of variance, are based on assumptions about the type of distribution; see Ludwig, J. A. et al, Statistical Ecology—A Primer on Methods and Computing, J. Wiley & Sons, New York, (1988), pages 281–295. Logistic regression is the preferred type of regression analysis capable of dealing with categorical (discrete) dependent variables; see Hosmer, Jr., D. W. et al, Applied Logistic Regression, John Wiley & Sons, New York, (1989), pages 1–7. Principal components analysis typically reduces the number of variables being considered by creating new compound variables which can cause difficulty in interpreting the results. The regression techniques can be sensitive to the presence of data containing errors and, as a result, can provide incorrect results or fail to identify important variables.

Many of the traditional cluster analysis methods, both partitioning and hierarchical, are encumbered by looking for many or all possible clusters within the data; this is followed by a cluster consolidation process. See Kaufman, L. et al, Finding Groups in Data—An Introduction to Cluster Analysis, John Wiley & Sons, New York, (1990), pages 37–50. For data sets with more than a few variables, which is typical of manufacturing data, some processes used to reduce the dimensionality (number of variables) of the data can make the results difficult to comprehend. While nonmetric cluster analysis avoids some of these problems and is quite well suited for determining variables important in finding and describing groupings in data, it is computationally intensive for data sets containing large numbers of records as is usually true of manufacturing data sets. See Matthews, G. B., et al, "Nonmetric Clustering and Association Analysis: Implications for the Evaluation of Multispecies Toxicity Tests and Field Monitoring," Environmental Toxicology and Risk Assessment-Third Volume, ASTM 1218, J. S. Hughes, G. B. Bidddinger, and E. Mones, Eds, American Society for Testing and Materials, Philadelphia, (1995), pages 79–93. Classification trees splits the data set into subsets such that the final output which contains the most important variables within specific ranges often contains a relatively small subset of the original data records.

Accordingly, there exists a need for an improved method for evaluating a data set for a repeated process and determining the ranges of values of the independent input process variables which are most associated with a specific outcome or range of values of a dependent output variable. Such a method should (1) accept both independent and dependent variables which are either numeric or categoric, (2) make no assumptions about the type of distribution for numeric variables, (3) be less sensitive to errors in the data set than most statistical techniques, (4) not subset the data as additional independent variables are added to the analysis, (5) be computationally efficient enough to be run on a typical desktop computer, and (6) directly output those variables and their value ranges most associated with specific outcomes.

SUMMARY OF THE INVENTION

The present invention provides a method for evaluating a data set for a repeated process and determining the ranges of values of a specific number of independent input process variables which are most closely associated with a specific process outcome. The independent input process variables can be either numeric or categoric in nature and the dependent output variable has either of exactly two outcomes. According to the inventive method, scores are obtained for each independent input variable as a measure of the frequency of occurrence of the specific process outcome when the numeric independent input variable is within a defined range or when the categoric independent input variable has each possible value. Iterative processes are used to maximize the score while selecting different combinations of the specific number of independent process variables. Accordingly, a manufacturing process can be enhanced by selecting the values of the independent input variables which are most likely to result in acceptable product and/or by avoiding the values of the independent input variables which are most likely to result in defective product.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1A:
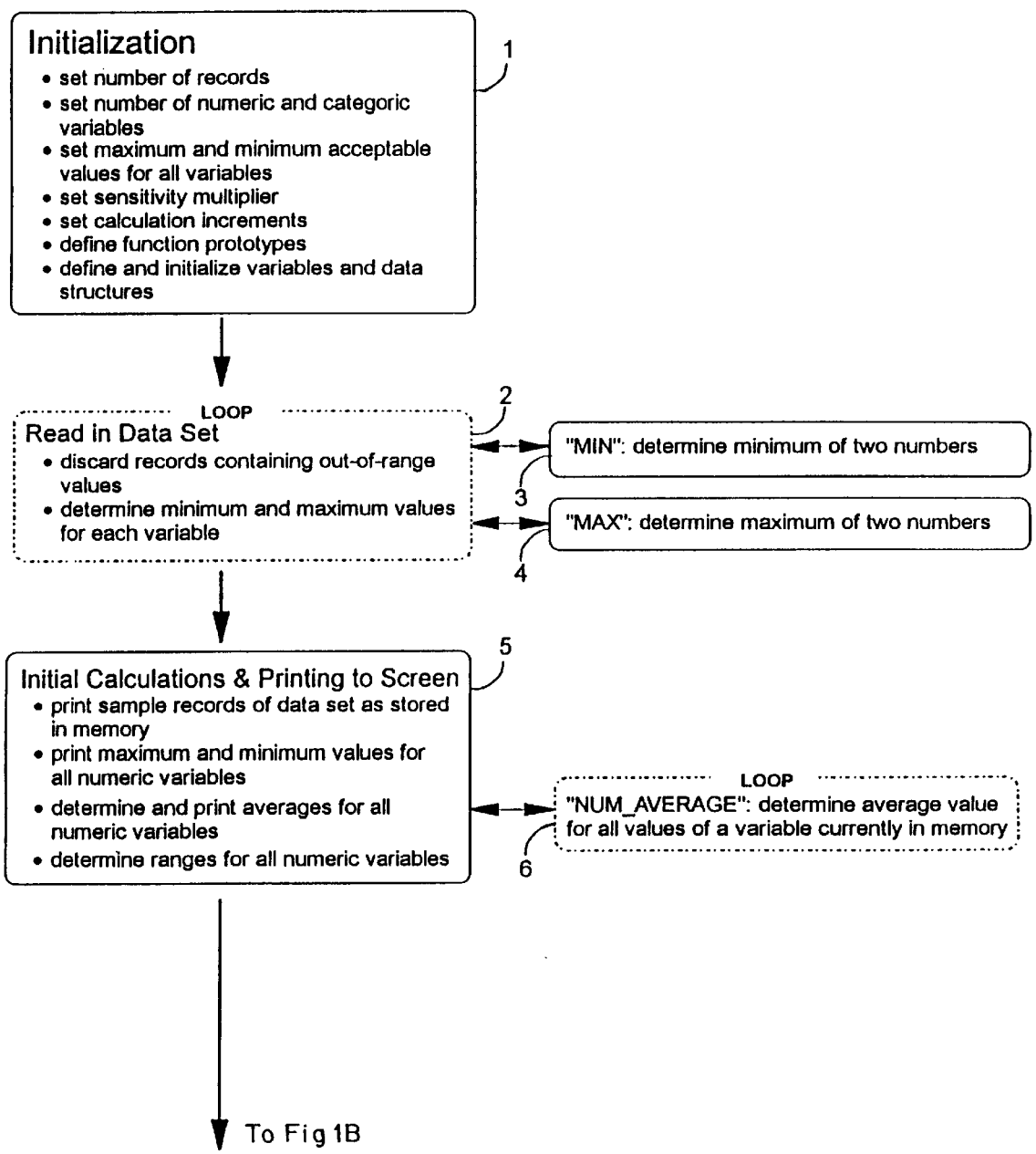
FIGS. 1A–1F together form a flow chart of an exemplary computer program which uses the method of this invention and which is useful in understanding how the inventive method can be implemented.
Figure 1B:
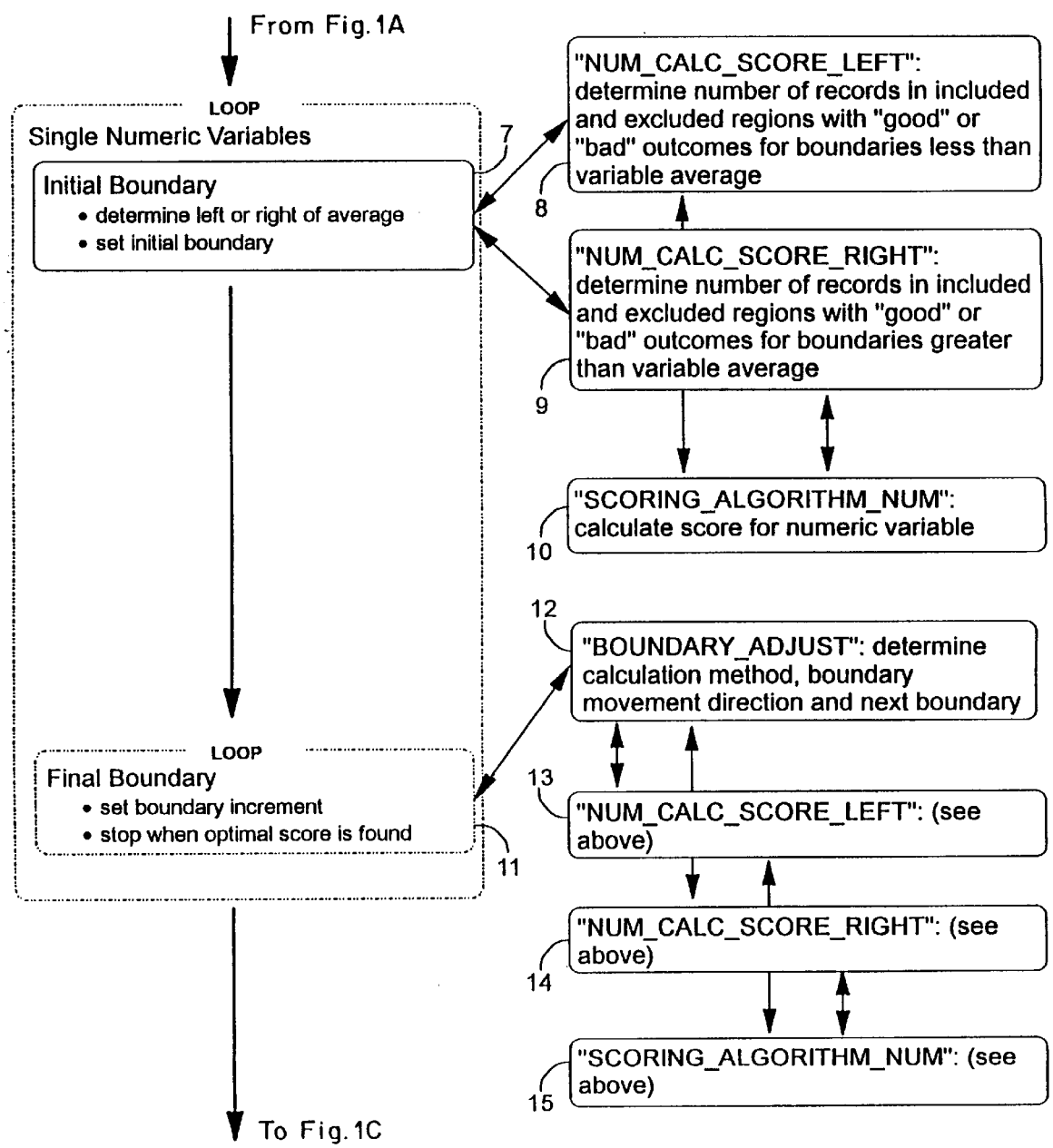
Figure 1C:
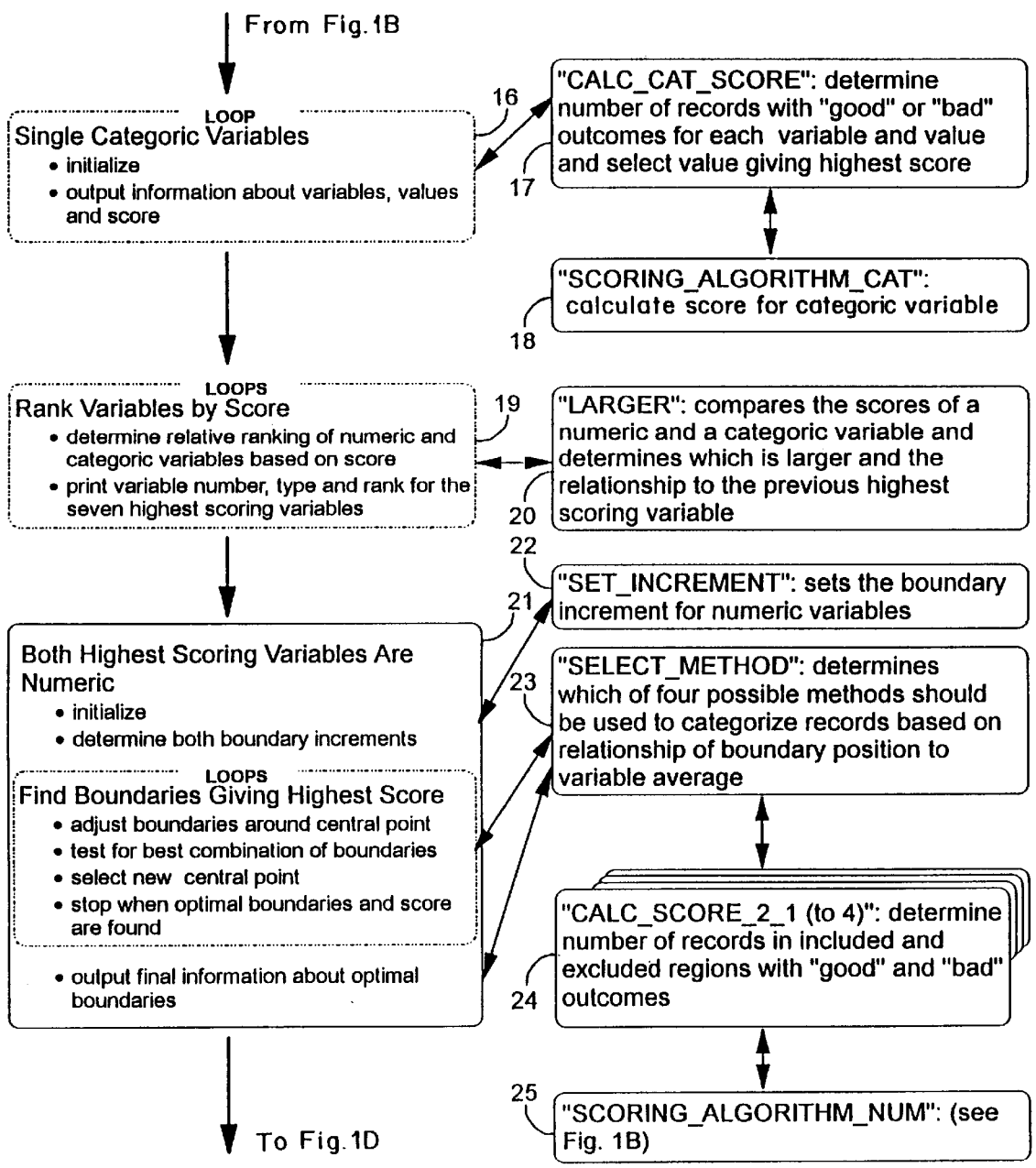
Figure 1D:
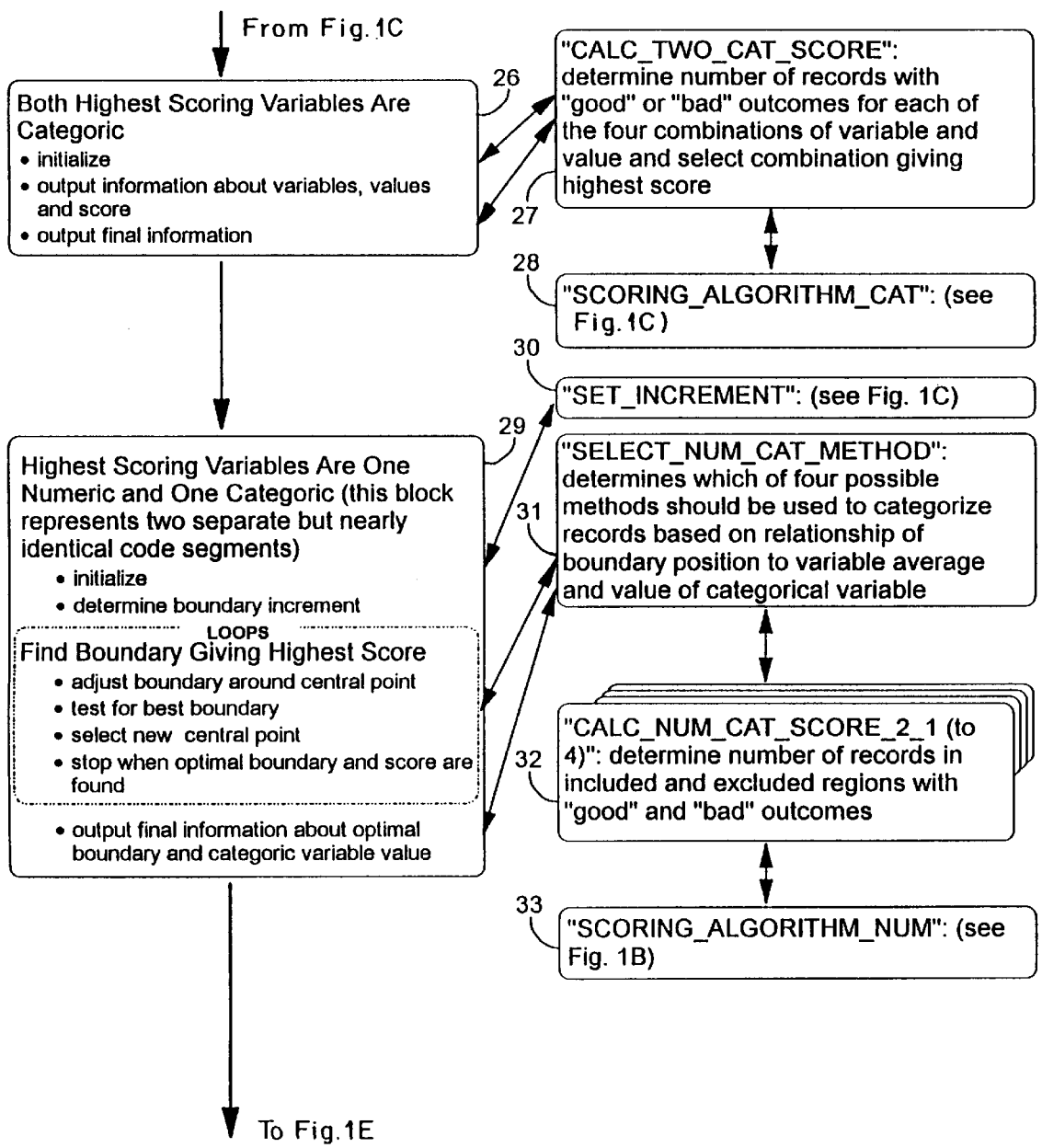
Figure 1E:
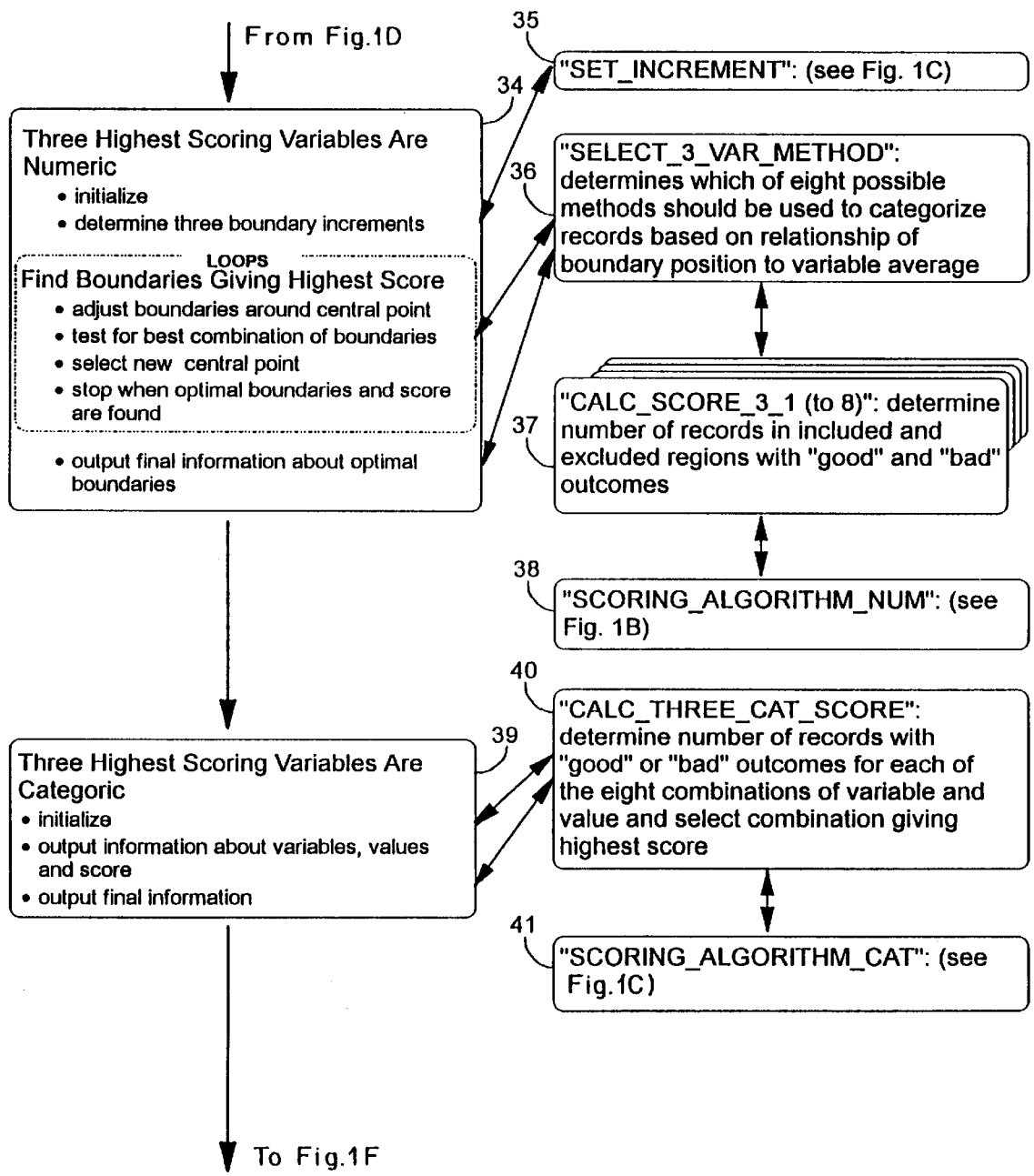
Figure 1F:
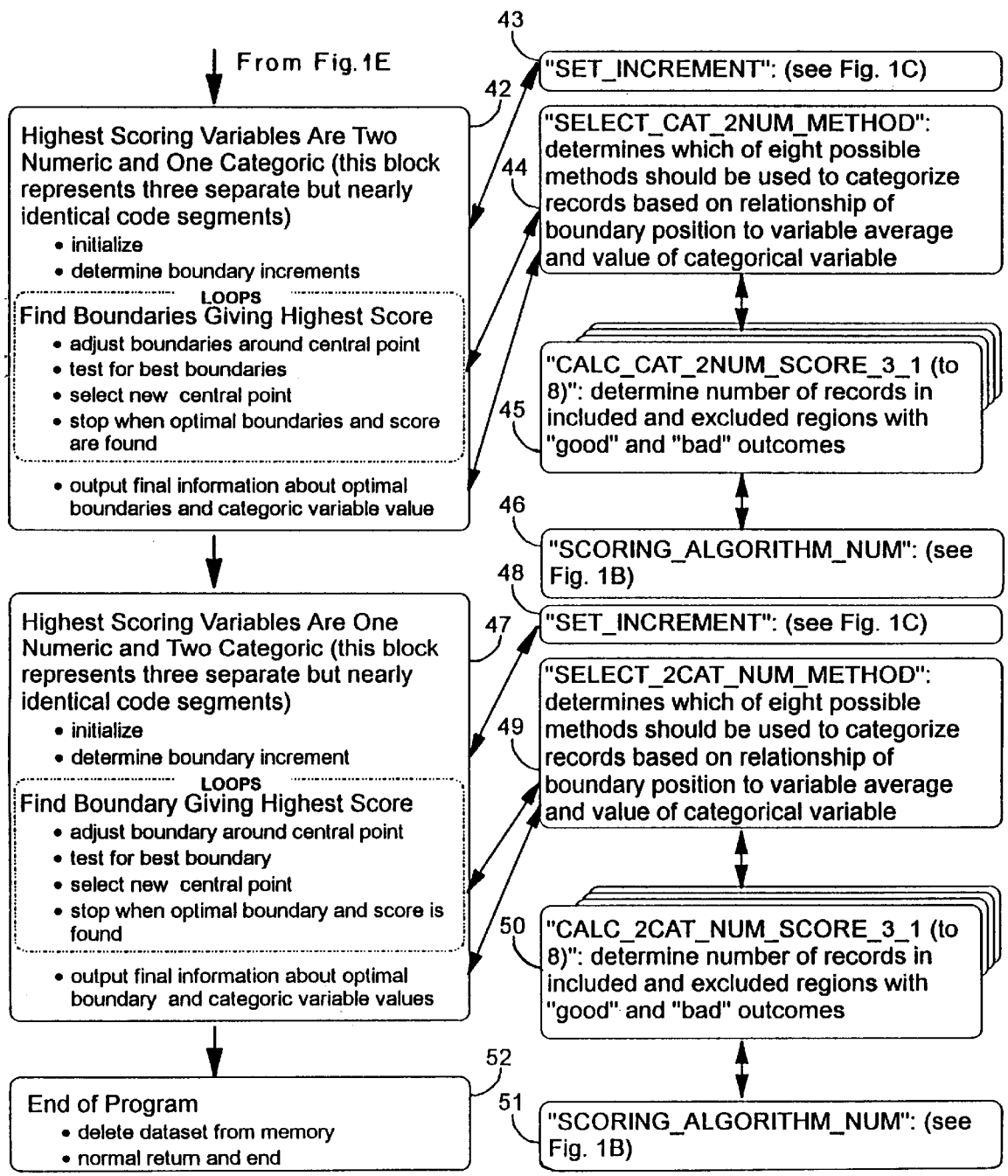

An objective of the inventive method, and a computer program based on the inventive method, is to process a data set in a way that permits the discovery of regions in parameter space that are associated with a specific type of outcome. The inventive method is utilized in conjunction with a repeated process. A plurality of independent input process variables (individually either numeric or categoric) results in a dependent output variable which has either of exactly two outcomes. Repeated operations of the process results in a data set which comprises a plurality of records each corresponding to a single operation of the process. Each record includes the respective values of the independent input variables and the outcome of the dependent output variable for that single operation of the process. Because the inventive method and exemplary computer program were conceived to address problems encountered in, but not unique to, the analysis of manufacturing data, the following discussions reflect this origin. Consequently, the data set will be referred to as if made up of manufacturing process parameters and product characteristics and an outcome of interest is the production of unacceptable pieces of product. However, the inventive method is applicable to many types of analysis and this invention is intended to be limited only by the scope of the appended claims. Thus, while the following description may refer to a single operation of the process, a "process" may include hundreds of steps, which may occur at different times, at different locations or facilities, or even at different companies.

After initialization and input processes, the inventive method finds the optimal "boundary" for each numeric independent input variable and calculates a "score" for each independent input variable, whether the variable is numeric or categoric. The method then finds the best "boundary(ies)" and highest "score" for the combination of the two highest scoring independent variables and is repeated for the three highest scoring independent variables. This can be repeated for any number of independent variables.

The "score" which is critical to the analysis process is basically a decision criteria. While there are many ways to calculate a "score", the following describes an exemplary way which appears to work well for manufacturing data. First, a numeric variable value is defined as "included" if the value is between the "boundary" and the maximum or minimum value for that variable, depending on whether the "boundary" is on the high or low side of the average for that variable. For categoric variables, "included" is determined by which of two values (i.e., categories) the variable has. One type of outcome is referred to as "bad", and the other is referred to as "good". For combinations of variables, the values of all of the variables for a particular process operation must be within the defined region of parameter space for the record associated with that operation to be "included". An exemplary "scoring" method used within the exemplary program is as follows:

Score=A times B times (1—C);

where

A=fraction of all "included" records which are "bad";
B=fraction of all "bad" records which are "included"; and
C=fraction of all "excluded" records which are "bad".

Optimal boundaries for numeric variables and the values of categoric variables are selected based on highest "scores". The flow chart of FIGS. 1A–1F, as will be described in detail hereinafter, provides a graphical representation of how the inventive method operates. Termination of each process which involves a "boundary" adjustment is by the achievement of a maximum "score".

There are two user specified inputs which affect the calculation processes for numeric "boundaries". A "sensitivity multiplier" is incorporated into the "scoring" process as a multiplier of C in the above equation. A "sensitivity multiplier" value less than one will tend to shrink the size of the "included" region; values greater than one will tend to increase the size of the "included" region by moving the optimal boundary into the "excluded" region. The values of the "increments" must be set so as to ensure that the boundary adjustment or search process is broad enough to find changes in the "score" due to that variable but small enough to find optimal values of the boundary. Typically, values of one to five percent of the total range are used.

An assumption of the inventive method is that there are regions in data variable space that are associated with an increased probability of a specific outcome or result. In the exemplary implementation of this concept, it is assumed that one of the two "boundaries" for each variable is the maximum (or minimum) value for that variable. The other "boundary" is that which the inventive method is designed to determine. For categoric variables, only two values can be assigned to each variable. For numeric variables, no assumption about the data value distribution is necessary. Ordinal data is not handled by the exemplary version of the method but there is no apparent reason why the inventive method should not be applicable to this type of data as well.

A requirement of the inventive method is an appropriate data set which contains all of the important data about the manufacture of a piece or group of products; each record in the data set would be a "production history" of a piece or group of pieces. The independent input process variables in the data set can be either numeric (continuous), such as composition or temperature, or categoric (discrete), such as supplier or machine operator. The outcome, or dependent output variable, can be either numeric, such as strength or resistivity, or categoric, such as pass/fail; however, the inventive method relies on treating each data record as representing only a "good" or "bad" outcome. There is only one outcome variable per record and it represents the acceptability or unacceptability of a single condition. In the input data set, there can be more than one outcome variable per record and these outcomes may be numeric. However, before being put into the data set in memory, the one outcome variable of interest is converted to a categoric variable having one of two values (e.g. zero or one). Missing or out-of-range data values cause the entire record to be dropped.

Referring now to the drawings, in the flow chart of FIGS. 1A–1F, the blocks on the left side represent segments of code within the "main" section of the program while the blocks on the right side represent "functions". The names of these functions are shown in quotation marks and precede a brief description of the function. The word "loop" and a broken, rather than solid, block outline designate parts of the program involving iterative processing. Arrows are used to designate the flow of control or data within the program.

For those functions which also are utilized in subsequent sections of the program, the description of the function is omitted and a reference to its first occurrence is included. Function blocks that are shown as having several hidden blocks behind the front block represent a group of functions which are very similar but differ in that they are designed to handle slightly different input data situations, such as the "bad" or "included" values of a variable which are above or below the average value for that variable. The number of separate functions is shown in the function name.

There are also sections within the main program (FIGS. 1D and 1F) where a single block is used in the flow chart to represent up to three code segments. This is designated in the title of the code block. These multiple code blocks represent situations in which different types of variables are ranked differently. For example, in FIG. 1D, the first of two nearly identical code segments is used to handle situations where a numeric variable is the highest scoring variable and a categoric variable is second. The second of the two is used when the highest scoring variable is a categoric variable and a numeric variable is second.

The following description of the operation of the exemplary program can be best appreciated by referring to the cited sections of the flow chart (FIGS. 1A–1F) and the other accompanying figures. The microfiche appendix contains an exemplary computer program written in Turbo C++ version 3.0 language implementing the flow chart of FIGS. 1A–1F.

After initialization 1, the data set is read into memory 2; minimum 3, maximum 4 and average 6 values are calculated for each numeric variable; ranges 5 are determined for all the numeric variables; and sample information is printed to the screen 5. For each numeric variable, the scoring algorithm 10 is used to determine if the initial boundary movement 7 should be toward lower values 8 than the average or toward higher values 9. A loop is then started to iteratively move the boundary 11, 12 until a high score 13, 14, 15 is found. This process can be visualized as in the frequency distribution diagram of FIG. 2 in which the boundary 55 is moved in small increments, either toward higher or lower values, and the number of "good" and "bad" outcomes in the included region 53 and the "good" and "bad" outcomes in the excluded region 54 are used to calculate a score for that boundary position.

Figure 3:
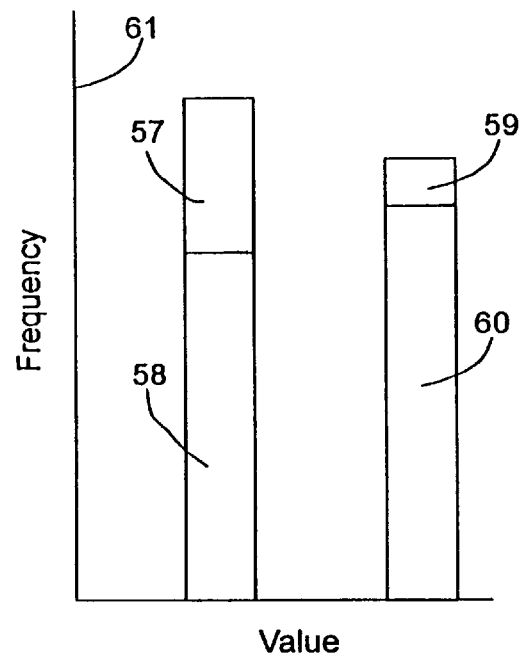
FIG. 3 is an exemplary frequency distribution diagram for an independent categoric input process variable showing the relative number of occurrences of a specific type of outcome for each of the two values the variable can have.

For each categoric variable 16 (FIG. 1C), the value of that variable most associated with "bad" outcomes and its score are determined 17, 18. This is accomplished using the number of "good" and "bad" outcomes for each of the two values that a categoric variable can have. In FIG. 3, the "good" 58 and "bad" 57 outcomes of the included region would be put into the scoring algorithm with the "good" 60 and "bad" 59 outcomes of the excluded region.

The program then ranks all of the numeric and categoric variables according to their scores 19, 20 (FIG. 1C), from high to low.

Figure 2:
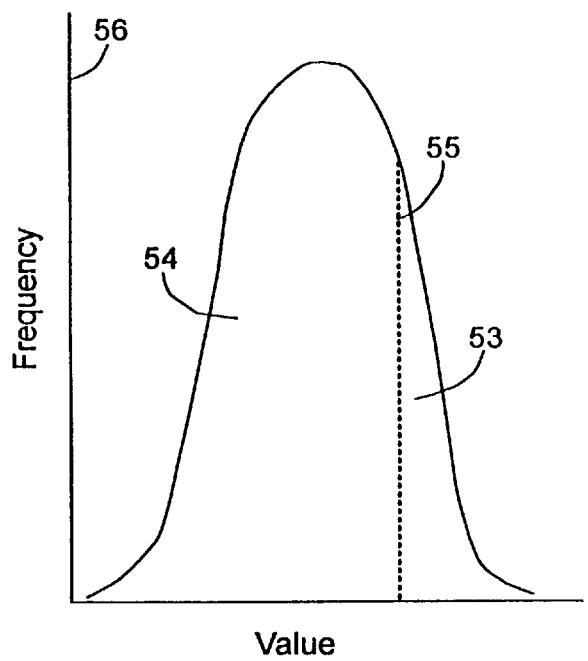
FIG. 2 is an exemplary frequency distribution diagram for an independent numeric input process variable showing a boundary between regions of relatively high and relatively low occurrences of a specific type of outcome.
Figure 4:
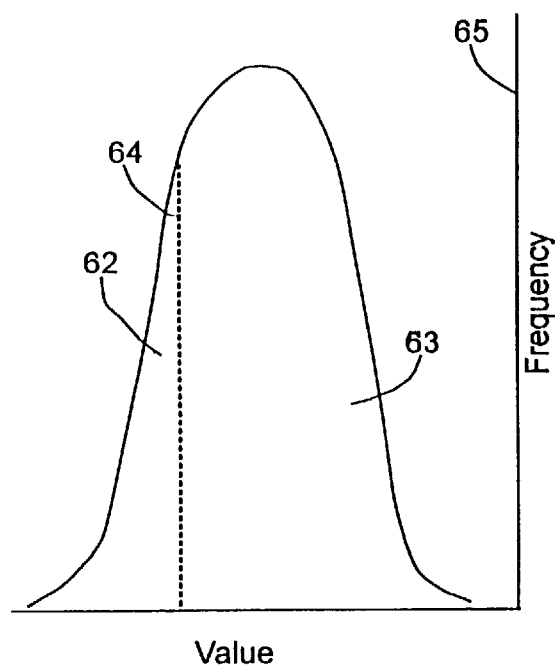
FIG. 4 is another exemplary frequency distribution diagram for another independent numeric input process variable showing a boundary between regions of relatively high and relatively low occurrences of a specific type of outcome.
Figure 5:
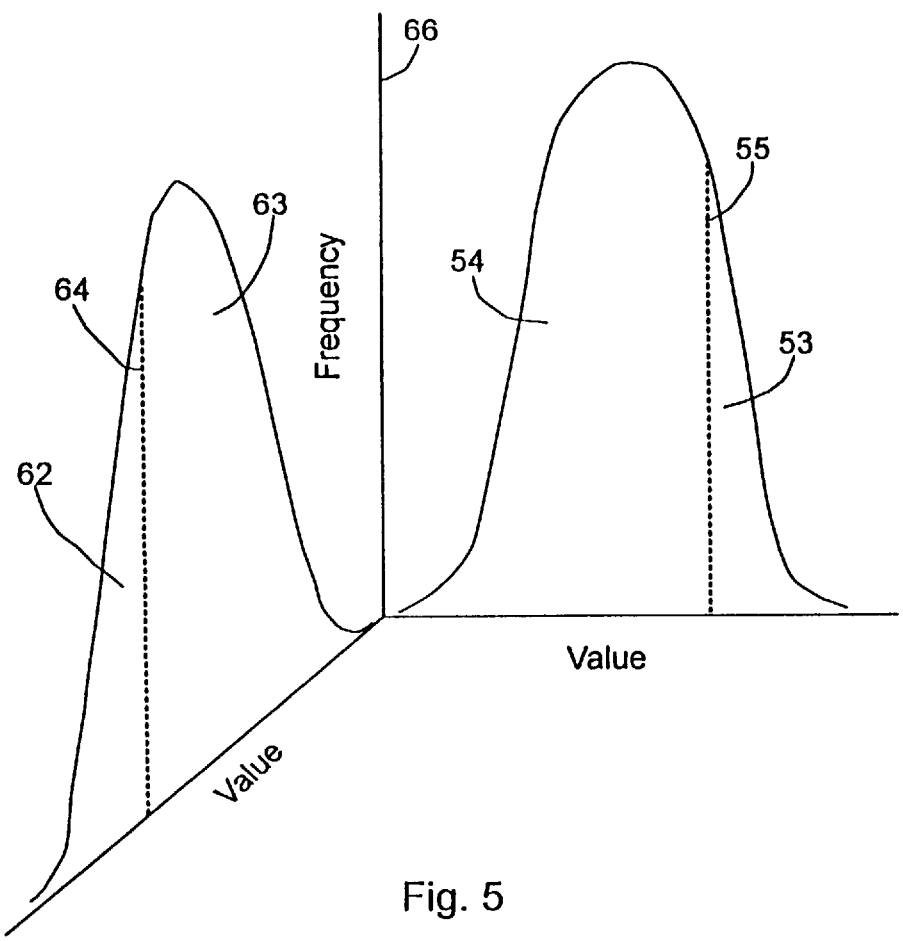
FIG. 5 is an exemplary diagram showing how the two frequency distribution diagrams of FIG. 2 and FIG. 4 can be joined along their ordinates to give a combined frequency distribution diagram.
Figure 6:
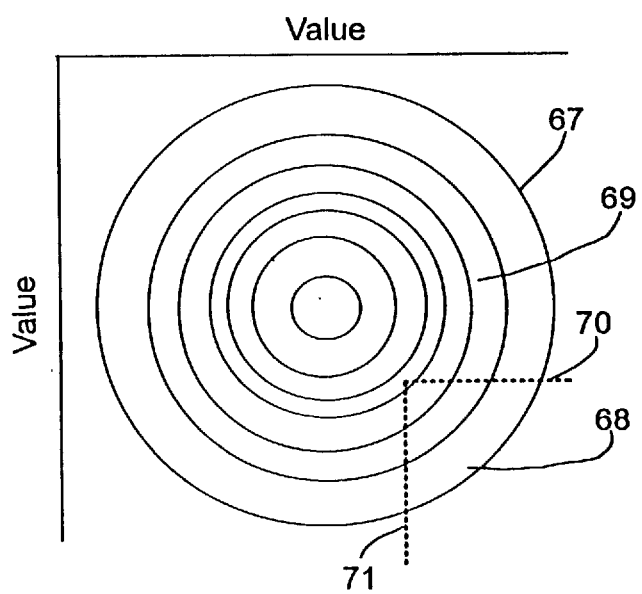
FIG. 6 is an exemplary diagram showing a projection onto the basal plane of the three dimensional frequency distribution diagram that would result from the joining process shown in FIG. 5.

FIG. 4 shows a frequency distribution diagram of a numeric variable slightly different from that shown in FIG. 2. In FIG. 4, the included region 62 is separated from the excluded region 63 by the boundary 64. If the highest scoring variable is a numeric variable having a frequency distribution similar to that shown in FIG. 2 and the second highest scoring variable is also a numeric variable having a slightly different distribution as shown in FIG. 4, the processes used to find the combination of those two variables and their value ranges most associated with "bad" outcomes can be envisioned as shown in FIGS. 5 and 6. FIG. 5 results from the joining of the axes 56 and 65 to form the axis 66. The two distributions are arranged at right angles. The resulting three dimensional frequency distribution would resemble a hillock; a basal projection of that hillock and the contour lines 67 are shown in FIG. 6. The initial estimates for the boundary 71 for the highest scoring variable and for the boundary 70 for the second highest scoring variable separate the included region 68 from the excluded region 69. The values of both boundaries 70, 71 then are iteratively incremented 21, 22 (FIG. 1C) until a highest score is found 23, 24, 25.

If both of the highest scoring single variables are categoric 26, the method determines 27, 28 the combination of values for the two variables most associated with "bad" outcomes and the score for that combination. This is accomplished by using the number of "good" and "bad" outcomes for each of the two values that the two categoric variable can have and calculating the score for each of the four possible combinations. The highest score is selected.

Figure 7:
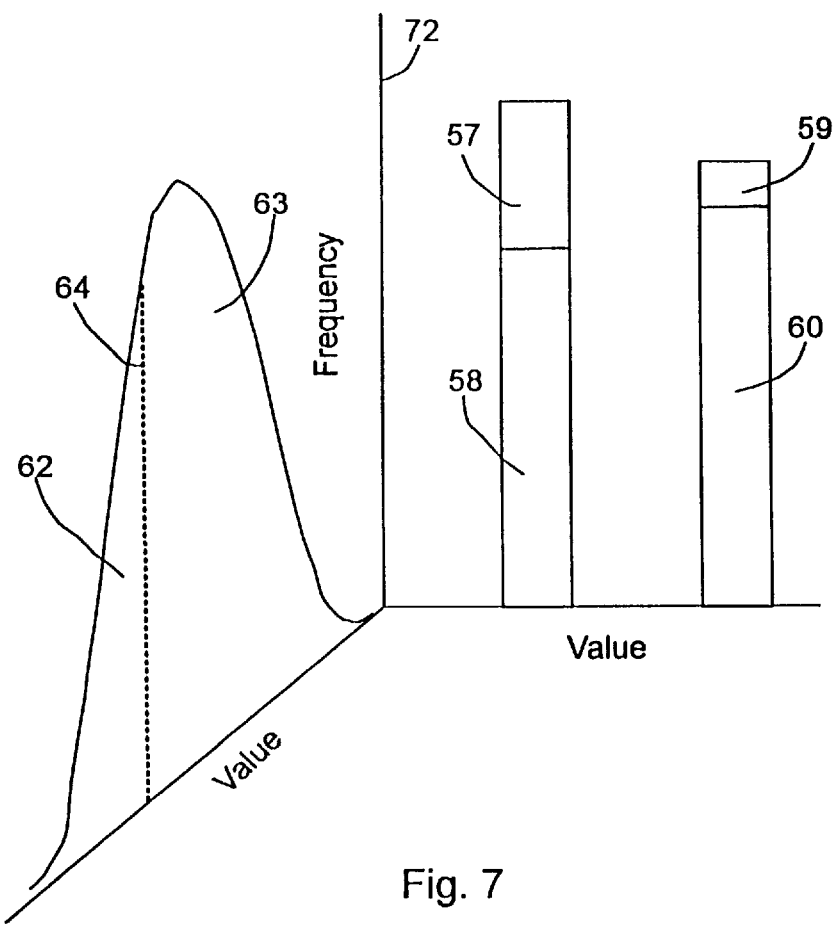
FIG. 7 is an exemplary diagram showing how the two frequency distribution diagrams of FIG. 3 and FIG. 4 can be joined along their ordinates to give a combined frequency distribution diagram.
Figure 8:
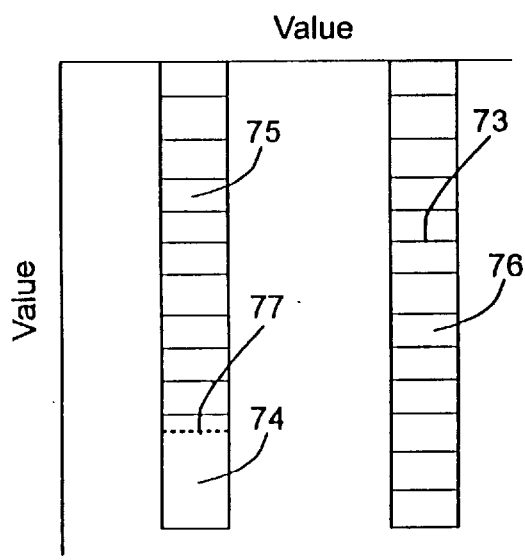
FIG. 8 is an exemplary diagram showing a projection onto the basal plane of the three dimensional frequency distribution diagram that would result from the joining process shown in FIG. 7.

If the highest scoring variable is a categoric variable having a frequency distribution similar to that shown in FIG. 3 and the second highest scoring variable is a numeric variable having a distribution as shown in FIG. 4, the processes used to find the combination of those two variables and their value ranges most associated with "bad" outcomes can be envisioned as shown in FIGS. 7 and 8. FIG. 7 results from the joining of the axes 61 and 65 to form the axis 72. The two distributions are arranged at right angles. A basal projection of the two resulting figures and the contour lines 73 are shown in FIG. 8. The initial estimate for the boundary 77 for the second highest scoring variable separates the included region 74 from the excluded region 75; the region 76 is considered to be excluded. The value of the boundary 77 then is iteratively incremented 29, 30 (FIG. 1D) until a highest score is found 31, 32, 33. If the highest and second highest scoring variables are numeric and categoric, respectively, the process of finding a best boundary and a high score for the combination of variables is similar.

If the three highest scoring single variables are numeric, the methods used to find the best combination of boundaries and the resulting score are analogous to those for two numeric variables as shown in FIGS. 5 and 6. The values of the three boundaries are iteratively incremented 34, 35 (FIG. 1E) until a highest score is found 36, 37, 38.

If the three highest scoring variables are categoric 39, the combination of values of the three variables most associated with "bad" outcomes and its score are determined 40, 41. This is accomplished using the number of "good" and "bad" outcomes for each of the two values that the three categoric variable can have and calculating the score for each of the eight possible combinations. The highest score is selected.

There are three possible combinations in which two of the three highest scoring variables are numeric and a third is categoric. The processes used to find the best combination of boundaries and the resulting score are analogous to that for one numeric and one categoric variable as shown in FIGS. 7 and 8. The values of the two boundaries are iteratively incremented 42, 43 (FIG. 1F) until a highest score is found 44, 45, 46.

There are three possible combinations in which two of the three highest scoring variables are categoric and a third is numeric. The processes used to find the best boundary and the resulting score are analogous to that for one numeric and one categoric variable as shown in FIGS. 7 and 8. The value of the boundary is iteratively incremented 47, 48 (FIG. 1F) until a highest score is found 49, 50, 51.

At this point, the exemplary version of the computer program ends 52. However, it is believed possible to extend the method and the programming concepts of the exemplary version of the program to permit the determination of any number of variables and their value ranges which are associated with a specific outcome.

It will be appreciated by one skilled in the art that the specific method outlined in the flow chart of FIGS. 1A–1F is merely exemplary for analyzing a data set and determining the combination of variables and the values of those variables which are associated with a specific outcome.

As described, this invention is directed to a new method implementable in a computer for evaluating a data set and determining the independent variables and values of those variables which are most associated with a specific outcome. A use for this method is the determination of manufacturing variables and values which tend to result in unacceptable product. Advantages of this invention include: analysis of data containing both numeric and categoric data types, absence of assumptions about the type of distribution for numeric variables, relative insensitivity to errors in the data set, retention of the full data set throughout the analysis process, computational efficiency, and direct output of those variables and their value ranges most associated with specific outcomes.

Figure 9:
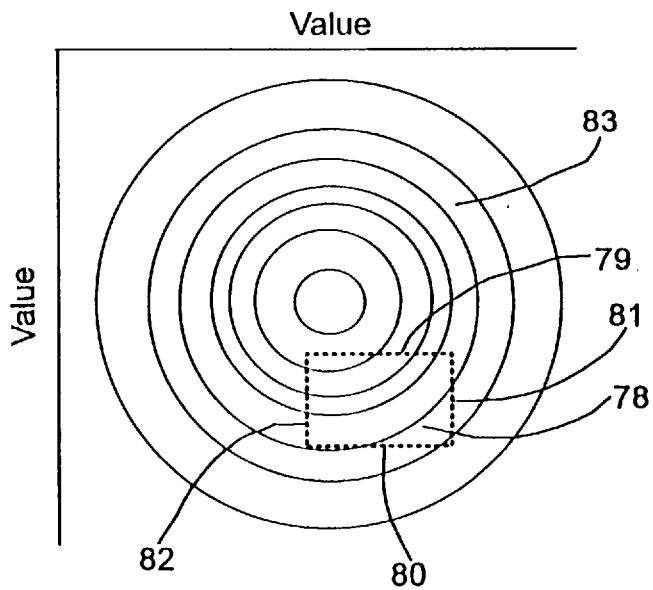
FIG. 9 is an exemplary diagram showing a projection onto the basal plane of a three dimensional frequency distribution diagram similar to FIG. 6 but in which the use of two boundaries for each numeric variable permits the identification of a combination of variables and the ranges of values of those variables having a particular type of outcome.

Although the above description contains many specificities, these should not be construed as limiting the scope of the invention but as merely providing illustrations of some of the presently preferred embodiments and capabilities of this invention. For example, the exemplary version of the software could be modified such that two boundaries could be found for each numeric variable. This would eliminate the assumption that one boundary of a numeric variable is one of the two extreme values. In this case, if the outcome of interest were defined as a relatively small percentage of product that was superior to typical product, it would be expected that the method and program could identify a combination of variables and value ranges that lay in the interior of the data distributions rather than at a periphery. FIG. 9 is similar to FIG. 6 but shows that the superior product range 78 is defined by two boundaries 79, 80 and 81, 82, respectively, for each of the two variables and is surrounded by a variable value region 83 which produces product of lesser quality. Arranging for these two variables of the manufacturing process to be targeted in this region would be expected to result in a higher percentage of superior product.

Figure 10:
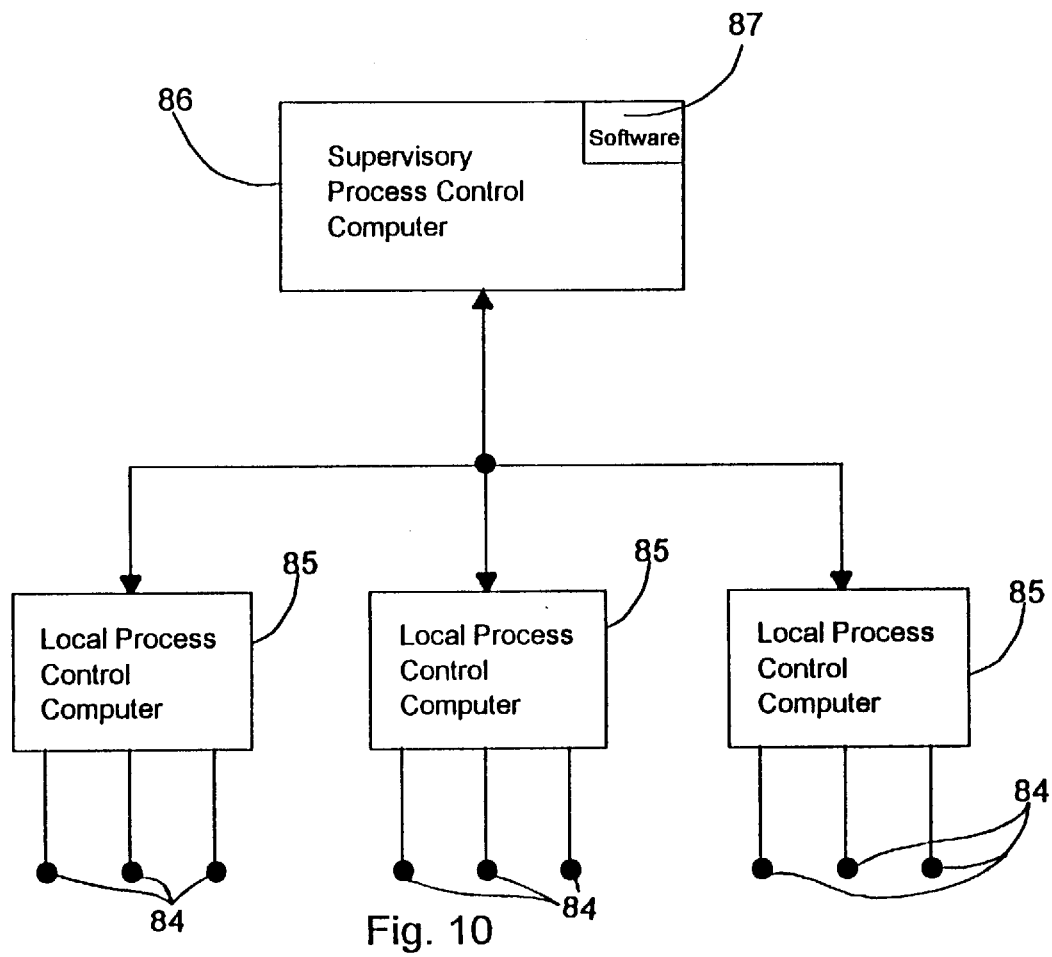
FIG. 10 is an exemplary block diagram showing a manufacturing process control system incorporating a computer operating in accordance with software implementing the method of this invention.

Additionally, the method could be included as part of an integrated manufacturing process control system as shown schematically in FIG. 10, where the arrowheads represent the flow of signals, which can include data, control signals or instructions. All of the data collected about the manufacture and quality of various pieces of product would be passed from sensors 84 to local process control computers 85 and to a supervisory process control computer 86 on a routine basis. Periodically, the resulting data set would be evaluated by the computer 86 using software 87 based upon the method of this invention to determine if any patterns exist which indicate that specific variables and value ranges are associated with product that does not meet a specific criterion. If such a pattern were found, the supervisory computer 86 could be programmed to alert an operator to take action. Alternatively, the computer 86 could be programmed to take some type of action which could include (1) immediately scrapping any subsequent pieces of product having this pattern to avoid additional processing costs of a piece likely to be unsatisfactory or (2) adjusting downstream processes to avoid the pattern when a piece having part of the pattern was detected. This latter practice is often termed feed-forward or adaptive manufacturing. Additionally, information from this type of analysis and system could be used in a type of feed-back loop arrangement in which the manufacturing process having one of the variables of this pattern would be modified for all pieces of product such that no piece of product was processed in the value range associated with the pattern. Each of these types of actions is expected to result in improved manufacturing efficiency.

An additional embodiment of the inventive method is the evaluation of all possible combinations of variables, rather than the step-wise process previously described, in which the next highest scoring variable is the only variable considered for inclusion as the number of variables in the combinations is increased. For example, in determining which two-variable combination is most associated with a specific outcome in a data set containing five independent variables, the best score for each of the ten possible two variable combinations would be determined and the combination with the highest score would be selected. This two-variable combination could be different from the two highest scoring single variables. In the embodiment of FIGS. 1A–1F, calculation of scores for all possible combinations of variables is not done, thereby improving computational efficiency.

One area for utilization of this method and its enabling software is in quality improvement in the manufacturing sector. By determining those variables and their value ranges that are associated with a specific outcome, the percentage of non-complying, out-of-specification or defective product could be reduced or the percentage of product that is superior to typical product could be increased. Reducing the "bads" and increasing the "goods" are two basic types of improvements to which this method could be applied for a wide range of applications in which a sequence of events leads to an outcome which can be described as either acceptable or unacceptable.

Some other areas where the inventive methodology could be used include, but are not limited to:

In medical practice, data on patient conditions, drug and surgical therapies, patient and family histories and other pertinent data such as doctor and hospital experience factors could be examined to find those combinations of variables and their values which lead to an increased chance of patient improvement.

In pollution control, data on feedstocks, operating conditions and ambient conditions could be examined to find those combinations of variables and their values which lead to increased periods of low emissions or the avoidance of incidents of high emissions.

In market research, data on the attributes and costs of various competing products and the preferences of purchasers and their final decisions on purchases could be examined to find those combinations of variables and their values which lead to an increased chance of purchase of a specific product relative to a competing product.

In manufacturing production planning, data on orders for specific types and quantities of products, delivery dates, machine and raw material availability, line and unit production levels and manpower skills and availability could be examined to find those combinations of variables and their values which lead to increased throughput, productivity, on-time deliveries and may assist in finding those activities that represent the "constraint" on the overall system.

In conclusion, the exemplary program set forth in the accompanying microfiche appendix accomplishes the analysis of a data set and the determination of a combination of variables and the values of those variables which are associated with a specific outcome.

Accordingly, there has been disclosed an improved method for analyzing data to determine the combination of input variables and their values which are most likely to result in a specific outcome. While an illustrative embodiment of this invention has been disclosed herein, it is understood that various modifications and adaptations to the disclosed embodiment are possible, and it is intended that this invention be limited only by the scope of the appended claims.

What is claimed is:

1. In conjunction with a repeated process wherein a plurality of independent input process variables results in a dependent output variable having either of exactly two outcomes, a method for implementation in a computer for evaluating a data set which comprises a plurality of records each corresponding to a single operation of the process and each record including the respective values of the independent variables and the outcome of the dependent variable for that single operation of the process, wherein each independent variable can be either numeric or categoric, the method determining a combination of a specific number of the independent variables and boundaries defining an included region of values for each of said specific number of independent variables which most likely results in a specific outcome of the dependent variable, the method comprising the steps of:

a) for each independent numeric variable
  a1) determining its range of values;
  a2) selecting an initial boundary within the determined range;
  a3) calculating a score where the included region is on each side of the initial boundary, wherein each said score is a measure of the frequency of occurrence of the specific outcome of the dependent variable when said each independent numeric variable has a value in the respective included region;
  a4) selecting the side of the initial boundary which resulted in the higher score to define an initial included region of values for said each independent numeric variable;
  a5) iteratively adjusting the boundary of the included region so as to alter the size of the included region and calculating the score based upon the altered included region for each boundary adjustment; and
  a6) selecting as the final boundary that boundary which provided the highest score;

b) for each independent categoric variable
  b1) calculating a score for each value of said each independent categoric variable, wherein each said score is a measure of the frequency of occurrence of the specific outcome of the dependent variable when said each independent categoric variable has said each value; and
  b2) selecting that value which provided the highest score;

c) ranking all the independent variables in order of their scores;

d) identifying the specific number of the independent variables which have the highest scores; and e) providing as an output a list of the identified independent variables and e1) the included region identified by the final boundary for each independent numeric variable; and e2) the selected value for each independent categoric variable.

2. The method according to claim 1 wherein each score is calculated as:

A times B times (1−C);

where:

A is the fraction of all records within the included region which have the specific outcome;

B is the fraction of all records having the specific outcome which are in the included region; and C is the fraction of all records not in the included region which have the specific outcome.

3. The method according to claim 1 wherein when all identified independent variables are numeric, the method comprises the further step of:

f) iteratively adjusting the final boundaries of all identified independent variables and calculating the score for the combination of independent variables and values which define the included region for each boundary adjustment to optimize the score.

4. The method according to claim 1 wherein when the identified independent variables are both numeric and categoric, the method comprises the further step of:

f) iteratively adjusting the final boundaries of all identified numeric independent variables and calculating the score for the combination of independent variables and values which define the included region for each boundary adjustment to optimize the score.

5. The method according to claim 1 wherein when all identified independent variables are categoric, the method comprises the further steps of:

f) determining the number of records with the specific outcome of the dependent variable for all combinations of identified independent variables and values;

g) calculating a score for each combination; and h) selecting the combination having the highest score.

6. In conjunction with a repeated process wherein a plurality of independent input process variables results in a dependent output variable having either of exactly two outcomes, a method for implementation in a computer for evaluating a data set which comprises a plurality of records each corresponding to a single operation of the process and each record including the respective values of the independent variables and the outcome of the dependent variable for that single operation of the process, wherein each independent variable can be either numeric or categoric, the method determining a combination of a specific number of the independent variables and boundaries defining an included region of values for each of said specific number of independent variables which most likely results in a specific outcome of the dependent variable, the method comprising the steps of:

a) for each independent numeric variable a1) determining its range of values;

a2) selecting an initial boundary within the determined range;

a3) calculating a score where the included region is on each side of the initial boundary, wherein each said score is a measure of the frequency of occurrence of the specific outcome of the dependent variable when said each independent numeric variable has a value in the respective included region;

a4) selecting the side of the initial boundary which resulted in the higher score to define an initial included region of values for said each independent numeric variable;

a5) iteratively adjusting the boundary of the included region so as to alter the size of the included region and calculating the score based upon the altered included region for each boundary adjustment; and a6) selecting as the final boundary that boundary which provided the highest score;

b) for each independent categoric variable b1) calculating a score for each value of said each independent categoric variable, wherein each said score is a measure of the frequency of occurrence of the specific outcome of the dependent variable when said each independent categoric variable has said each value; and b2) selecting that value which provided the highest score;

c) selecting combinations of the specific number of the independent variables;

d) for each selected combination iteratively adjusting the final boundaries of the numeric independent variables and calculating the score for the combination of independent variables and values which define the included region for each boundary adjustment to optimize the score; and e) providing as an output a list of the independent variables in the combination which provided the highest score and e1) the included region identified by the final boundary for each independent numeric variable in the highest scoring combination; and e2) the selected value for each independent categoric variable in the highest scoring combination.

7. The method according to claim 6 wherein each score is calculated as:

A times B times (1−C);

where:

A is the fraction of all records within the included region which have the specific outcome;

B is the fraction of all records having the specific outcome which are in the included region; and C is the fraction of all records not in the included region which have the specific outcome.

8. A method implementable in a computer for controlling a manufacturing process to increase the likelihood of occurrence of a specific one of exactly two outcomes of the process if said specific outcome is acceptable or to decrease the likelihood of occurrence of said specific one of exactly two outcomes of the process if said specific outcome is unacceptable, wherein for each operation of the process a plurality of independent input variables results in a dependent output variable having either of said exactly two outcomes, the method determining a combination of a specific number of the independent variables and boundaries defining an included region of values for each of said specific number of independent variables which most likely results in said specific outcome of the dependent variable, the method comprising the steps of:

a) generating a data set which comprises a plurality of records each corresponding to a single operation of the process and each record including the respective values of the independent variables and the outcome of the dependent variable for that single operation of the process, wherein each independent variable can be either numeric or categoric;

b) for each independent numeric variable b1) determining its range of values;

b2) selecting an initial boundary within the determined range;

b3) calculating a score where the included region is on each side of the initial boundary, wherein each said score is a measure of the frequency of occurrence of the specific outcome of the dependent variable when said each independent numeric variable has a value in the respective included region;

b4) selecting the side of the initial boundary which resulted in the higher score to define an initial included region of values for said each independent numeric variable;

b5) iteratively adjusting the boundary of the included region so as to alter the size of the included region and calculating the score based upon the altered included region for each boundary adjustment; and b6) selecting as the final boundary that boundary which provided the highest score;

c) for each independent categoric variable c1) calculating a score for each value of said each independent categoric variable, wherein each said score is a measure of the frequency of occurrence of the specific outcome of the dependent variable when said each independent categoric variable has said each value; and c2) selecting that value which provided the highest score;

d) ranking all the independent variables in order of their scores;

e) identifying the specific number of the independent variables which have the highest scores; and f) controlling the process f1) if said specific outcome is acceptable by limiting each identified independent numeric variable to the included region identified by the final boundary for that independent numeric variable and by limiting each independent categoric variable to the selected value for that independent categoric variable; or f2) if said specific outcome is unacceptable by limiting each identified independent numeric variable to be outside the included region identified by the final boundary for that independent numeric variable and by limiting each identified independent categoric variable to not have the selected value for that independent categoric variable.

9. The method according to claim 8 wherein each score is calculated as:

A times B times (1−C);

where:

A is the fraction of all records within the included region which have the specific outcome;

B is the fraction of all records having the specific outcome which are in the included region; and C is the fraction of all records not in the included region which have the specific outcome.

10. The method according to claim 8 wherein when all identified independent variables are numeric, the method comprises the further step of:

g) iteratively adjusting the final boundaries of all identified independent variables and calculating the score for the combination of independent variables and values which define the included region for each boundary adjustment to optimize the score.

11. The method according to claim 8 wherein when the identified independent variables are both numeric and categoric, the method comprises the further step of:

g) iteratively adjusting the final boundaries of all identified numeric independent variables and calculating the score for the combination of independent variables and values which define the included region for each boundary adjustment to optimize the score.

12. The method according to claim 8 wherein when all identified independent variables are categoric, the method comprises the further steps of:

g) determining the number of records with the specific outcome of the dependent variable for all combinations of identified independent variables and values;

h) calculating a score for each combination; and i) selecting the combination having the highest score.

13. A method for implementation in a computer to evaluate a data set for a repeated process, said data set comprising a plurality of records each corresponding to a respective operation of the process and containing the values of a plurality of input independent variables and the resultant one of exactly two possible outcomes of a dependent output variable, the method comprising the steps of:

a) inputting said data set into a work area of the computer memory;

b) iteratively calculating a single variable score for a value range for each of said independent variables in which each said single variable score is proportional to a frequency of occurrence of a specific outcome of said dependent variable and adjusting the value range to optimize the calculated score;

c) iteratively calculating a double variable score for a pair of value ranges for each combination of two of said independent variables in which each said double variable score is proportional to a frequency of occurrence of said specific outcome of said dependent variable and adjusting the pair of value ranges to optimize the calculated score;

d) iteratively calculating a triple variable score for a trio of value ranges for each combination of three of said independent variables in which each said triple variable score is proportional to a frequency of occurrence of said specific outcome of said dependent variable and adjusting the trio of value ranges to optimize the calculated score;

e) determining the largest said single variable score and the associated one of said independent variables;

f) determining the largest said double variable score and the associated two of said independent variables;

g) determining the largest said triple variable score and the associated three of said independent variables; and h) outputting said scores and associated said value ranges of said independent variables;

whereby said process can be controlled by varying said value ranges of said independent variables to vary the likelihood of occurrence of said specific outcome of said dependent variable.

14. The method according to claim 13 wherein said independent variables can be either numeric or categoric and said dependent variable is categoric.

15. The method according to claim 14 wherein said value ranges of said independent variables which are numeric are determined by iteratively adjusting the ends of said value ranges while calculating said single variable score and while calculating said double variable score and while calculating said triple variable score to thereby achieve the approximately highest value of said single variable score, said double variable score and said triple variable score.

16. The method according to claim 15 wherein said double variable score is calculated using those two independent variables having the two highest single variable scores and said triple variable score is calculated using those three independent variables having the three highest single variable scores, whereby computational efficiency is achieved by calculating said double variable score and said triple variable score only for those combinations of independent variables most likely to result in relatively higher scores.

17. In conjunction with a repeated process wherein a plurality of independent input process variables results in a dependent output variable having either of exactly two outcomes, a method for implementation in a computer for evaluating a data set which comprises a plurality of records each corresponding to a single operation of the process and each record including the respective values of the independent variables and the outcome of the dependent variable for that single operation of the process, wherein each independent variable can be either numeric or categoric, the method determining a combination of a specific number of the independent variables and boundaries defining an included region of values for each of said specific number of independent variables which most likely results in a specific outcome of the dependent variable, the method comprising the steps of:

a) for each independent numeric variable
        a1) determining its range of values;
        a2) selecting a pair of initial boundaries within the determined range;
        a3) calculating a score where the included region is between the pair of initial boundaries, wherein said score is a measure of the frequency of occurrence of the specific outcome of the dependent variable when said each independent numeric variable has a value in the respective included region;
        a4) iteratively adjusting the pair of boundaries within the range so as to alter the size of the included region and calculating the score based upon the altered included region for each boundary adjustment; and
        a5) selecting as the final boundaries that pair of boundaries which provided the highest score;
    b) for each independent categoric variable
        b1) calculating a score for each value of said each independent categoric variable, wherein each said score is a measure of the frequency of occurrence of the specific outcome of the dependent variable when said each independent categoric variable has said each value; and
        b2) selecting that value which provided the highest score;
    c) selecting combinations of the specific number of the independent variables;
    d) for each selected combination iteratively adjusting the final pair of boundaries of the numeric independent variables and calculating the score for the combination of independent variables and values which define the included region for each boundary adjustment to optimize the score; and
    e) providing as an output a list of the independent variables in the combination which provided the highest score and
        e1) the included region identified by the final pair of boundaries for each independent numeric variable in the highest scoring combination; and
        e2) the selected value for each independent categoric variable in the highest scoring combination.

18. The method according to claim 17 wherein each score is calculated as:

A times B times (1−C);

where:

A is the fraction of all records within the included region which have the specific outcome;

B is the fraction of all records having the specific outcome which are in the included region; and C is the fraction of all records not in the included region which have the specific outcome.

* * * * *